Dec. 15, 1931.  W. F. CONOVER  1,836,015
CHAIN FASTENER
Filed Aug. 6, 1931
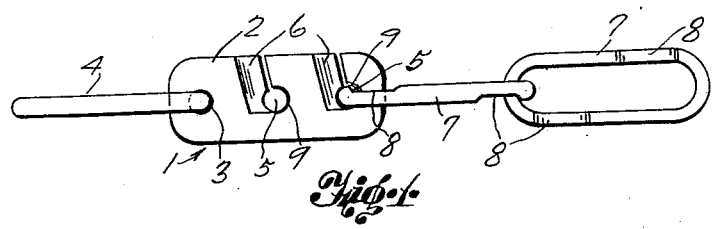
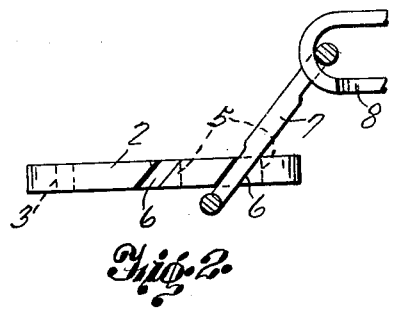
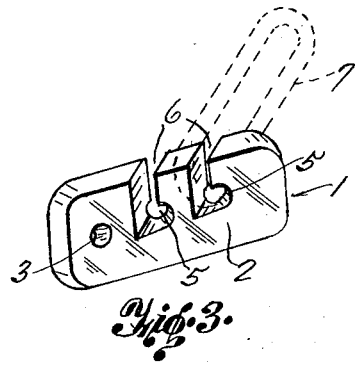
INVENTOR:
William F. Conover
BY Adam E. Fisher
ATTORNEY Patented Dec. 15, 1931

1,836,015

UNITED STATES PATENT OFFICE

WILLIAM F. CONOVER, OF LIMA, ILLINOIS

CHAIN FASTENER

Application filed August 6, 1931. Serial No. 555,424.

This invention relates to chain fasteners. The main object of the invention is to provide a device by means of which the ends of two chains as for instance auto tire chains, may be readily and quickly fastened together in such manner that they will not accidentally come apart yet they may be readily disconnected when desired.

Another object is to provide a chain fastener in a simple, inexpensive, durable and efficient form.

With these and other objects in view the invention resides in the novel construction and arrangement of parts as hereinafter set forth and claimed reference being had to the accompanying drawings wherein:

Figure 1 is a side view of the fastener and the two ends of two chains as connected thereby.

Figure 2 is a plan view of the fastener showing the end of one chain partially inserted in the fastener.

Figure 3 is a perspective view of the fastener showing in dotted lines one link of a chain partially inserted in the fastener.

Referring now more particularly to the drawings the reference character 1 designates generally the fastener formed of a substantially rectangular block 2 having an aperture 3 near one end through which is fastened the end link 4 of a chain or by means of which the fastener is secured to any desired device or object. A plurality of spaced apertures 5 are provided in the block 2 and slots or passages 6 are cut in the block and extend from these apertures 5 outward to the edge of the block. The slots 6 are obliquely or angularly cut in the block relative to the side faces thereof and to the axes of the apertures 5 and the width of these slots is somewhat less than the diameter of the apertures 5. The chain to be attached to the fastener has its end links 7 cut away on opposite sides and adjacent each end as shown at 8 whereby they are reduced in thickness sufficiently to enter the slots 6, the remainder of the links of course being of such size as to freely enter the apertures 5.

In the operation of connecting the chain to the fastener or, in other words, connecting the two chains together, the fastener block 2 is grasped in one hand and an end link 7 in the other. The link 7 is then twisted around angularly and turned on edge and one of the reduced portions 8 slipped down through either of the slots 6 as shown in Figure 2. The link is then swung downward and turned around into alignment with the block 2 causing the rounded end of the link to slip into the aperture 5 as shown in Figure 1. It will be noted that the block 2 is beveled around the ends of the apertures 5 as shown at 9 to permit the free play of the rounded ends of the links 7 therethrough. As will be evident this operation is simple and readily performed and the link may be removed from the block by simply reversing the procedure. It is further apparent that the chains can not become accidentally disconnected and the fastener for this reason is particularly adapted for use on tire chains. Any desired number of apertures 5 and slots 6 may be provided in the block 2 and any desired number of the links 7 may be provided with the reduced portions 8 to permit a wide range of adjustment.

While I have herein set forth a certain preferred embodiment of my invention, it is understood that I may vary from the same in minor structural details so as best to construct a practical device for the purposes intended, not departing from the spirit of the invention and within the scope of the appended claim.

I claim:

In a chain fastener, a chain having its links reduced in thickness upon opposite sides and adjacent their ends, and a rectangular fastener block having spaced apertures extended from side to side and beveled around their ends, the said block having slots extended from the apertures out through one edge of the block, the said slots being cut angularly with respect to the side faces of the block and to the axes of the apertures, and the width of the slots being less than the diameter of the apertures and being adapted to receive the reduced portions of the chain links.

In testimony whereof I affix my signature.

WILLIAM F. CONOVER.